(12) United States Patent
Wang et al.

(10) Patent No.: US 11,936,974 B2
(45) Date of Patent: Mar. 19, 2024

(54) ACTUATOR, CAMERA UNIT AND ELECTRONIC DEVICE

(71) Applicant: BEIJING XIAOMI MOBILE SOFTWARE CO., LTD., Beijing (CN)

(72) Inventors: Hui Wang, Beijing (CN); Bin Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 14 days.

(21) Appl. No.: 17/562,179

(22) Filed: Dec. 27, 2021

(65) Prior Publication Data

US 2022/0385794 A1 Dec. 1, 2022

(30) Foreign Application Priority Data

May 31, 2021 (CN) .......................... 202110604807.6

(51) Int. Cl.
*H04N 23/55* (2023.01)
*G02B 3/12* (2006.01)
*G03B 13/36* (2021.01)
*H04N 23/57* (2023.01)

(52) U.S. Cl.
CPC .............. *H04N 23/57* (2023.01); *G02B 3/12* (2013.01); *G03B 13/36* (2013.01); *H04N 23/55* (2023.01)

(58) Field of Classification Search
CPC ........ H04N 23/54; H04N 23/55; H04N 23/57; G02B 3/12
USPC ......................................................... 348/374
See application file for complete search history.

(56) References Cited

U.S. PATENT DOCUMENTS

| 9,001,224 B2* | 4/2015 | Moriya | H04N 23/687 348/208.99 |
| 2023/0014687 A1* | 1/2023 | Hwang | G03B 17/12 |
| 2023/0064006 A1* | 3/2023 | Kim | H04N 23/55 |

FOREIGN PATENT DOCUMENTS

| CN | 110109243 A | 8/2019 |
| JP | 2009251244 A | 10/2009 |
| JP | 2011085666 A | 4/2011 |
| KR | 100568295 B1 | 4/2006 |
| KR | 20110008714 U | 9/2011 |

OTHER PUBLICATIONS

Taiwan Patent Application No. 110148997, Office Action dated Nov. 11, 2022, 8 pages.
Taiwan Patent Application No. 110148997, English translation of Office Action dated Nov. 11, 2022, 13 pages.
(Continued)

*Primary Examiner* — Anthony J Daniels
(74) *Attorney, Agent, or Firm* — COZEN O'CONNOR

(57) ABSTRACT

An actuator, the actuator is used for the camera unit. The actuator includes: a seat configured to be assembled with a first lens and a fluid lens of the camera unit; a stator assembly fixedly connected to the seat; a focusing mover assembly configured to be connected with the fluid lens; and an anti-shake mover assembly configured to be connected with the first lens. The focusing mover assembly is configured to move along a first direction of the seat by interacting with the stator assembly, for adjusting a curvature of the fluid lens, and the anti-shake mover assembly is configured to translate in a plane perpendicular to the first direction by interacting with the stator assembly, for driving the first lens to move.

17 Claims, 4 Drawing Sheets

(56) References Cited

OTHER PUBLICATIONS

Japanese Patent Application No. 2021-214911, Office Action dated Dec. 20, 2022, 7 pages.
Japanese Patent Application No. 2021-214911, English translation of Office Action dated Dec. 20, 2022, 7 pages.
Korean Patent Application No. 10-2021-0189270, Office Action dated Oct. 26, 2023, 6 pages.
Korean Patent Application No. 10-2021-0189270, English translation of Office Action dated Oct. 26, 2023, 7 pages.

* cited by examiner

ACTUATOR, CAMERA UNIT AND ELECTRONIC DEVICE

CROSS-REFERENCE TO RELATED APPLICATION

The present disclosure is based on and claims priority to Chinese Patent Application No. 202110604807.6, filed on May 31, 2021, the entire content of which is incorporated herein by reference.

TECHNICAL FIELD

The present disclosure relates to a field of terminals, and more particularly, to an actuator, a camera unit and an electronic device.

BACKGROUND

With the development of science and technology, users have higher and higher requirements for the photographing function and the image quality of a terminal equipment. In order to improve image quality of a camera, the camera may be configured to improve the focus function and the anti-shake function.

SUMMARY

According to embodiments of a first aspect of the present disclosure, an actuator for a camera unit is provided. The actuator includes: a seat configured to be assembled with a first lens and a fluid lens of the camera unit; a stator assembly fixedly connected to the seat; a focusing mover assembly configured to be connected with the fluid lens; and an anti-shake mover assembly configured to be connected with the first lens. The focusing mover assembly is configured to move along a first direction of the seat by interacting with the stator assembly, for adjusting a curvature of the fluid lens, and the anti-shake mover assembly is configured to translate in a plane perpendicular to the first direction by interacting with the stator assembly, for driving the first lens to move.

According to embodiments of a second aspect of the present disclosure, a camera unit is provided. The camera unit includes a fluid lens, a first lens and an actuator. The actuator includes: a seat assembled with the fluid lens and the first lens; a stator assembly fixedly connected to the seat; a focusing mover assembly connected with the fluid lens; and an anti-shake mover assembly connected with the first lens. The focusing mover assembly is configured to move along a first direction of the seat by interacting with the stator assembly, for adjusting a curvature of the fluid lens, and the anti-shake mover assembly is configured to translate in a plane perpendicular to the first direction by interacting with the stator assembly, for driving the first lens to move.

According to embodiments of a third aspect of the present disclosure, an electronic device is provided. The electronic device includes a camera unit. The camera unit includes a fluid lens, a first lens and an actuator. The actuator includes: a seat assembled with the fluid lens and the first lens; a stator assembly fixedly connected to the seat; a focusing mover assembly connected with the fluid lens; and an anti-shake mover assembly connected with the first lens. The focusing mover assembly is configured to move along a first direction of the seat by interacting with the stator assembly, for adjusting a curvature of the fluid lens, and the anti-shake mover assembly is configured to translate in a plane perpendicular to the first direction by interacting with the stator assembly, for driving the first lens to move.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of apparatuses and methods consistent with aspects related to the present disclosure as recited in the appended claims.

Terms used herein in the description of the present disclosure are only for the purpose of describing specific embodiments, but should not be construed to limit the present disclosure. As used in the description of the present disclosure and the appended claims, "a", "said" and "the" in singular forms mean to include plural forms, unless clearly indicated in the context otherwise. It should also be understood that, as used herein, the term "and/or" represents and contains any one and all possible combinations of one or more associated listed items.

It should be understood that, although terms such as first, second and third are used herein for describing various kinds of information in the present disclosure, such information should not be limited to these terms. These terms are only used for distinguishing the same type of information from each other. For example, without departing from the scope of the present disclosure, a first information may also be called as a second information, and similarly, the second information may also be called as the first information. Depending on the context, the term "if" may be construed to mean "when" or "upon" or "in response to determining".

In the related art, a liquid lens in the camera may be squeezed by unequal forces to achieve focusing through the deformation of the liquid lens. At the same time, due to the different forces, the degrees of deformation of various areas of the liquid lens are different, so that a transmission path of an incident light can be adjusted, thus achieving the anti-shake.

However, in the related art, the deformation of the liquid lens is used to achieve both the anti-shake and the focusing effects. In some cases, it is inevitable that the focusing effect is good, while the anti-shake effect is not ideal; or, the anti-shake effect is relatively good, while the focusing cannot be achieved. That is, it is difficult to achieve both the anti-shake effect and the focusing effect of the camera.

Figure 1:
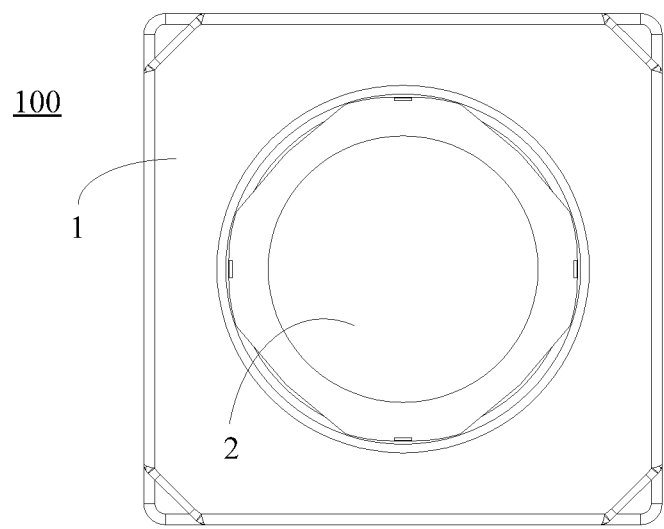
FIG. 1 is a top view of a camera unit according to an illustrative embodiment of the present disclosure.
Figure 2:
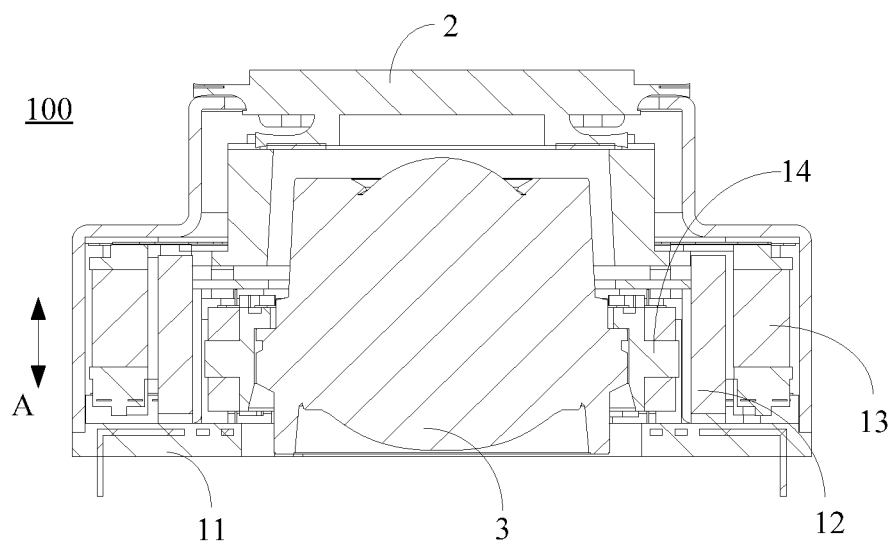
FIG. 2 is a sectional view of the camera unit in FIG. 1.
Figure 3:
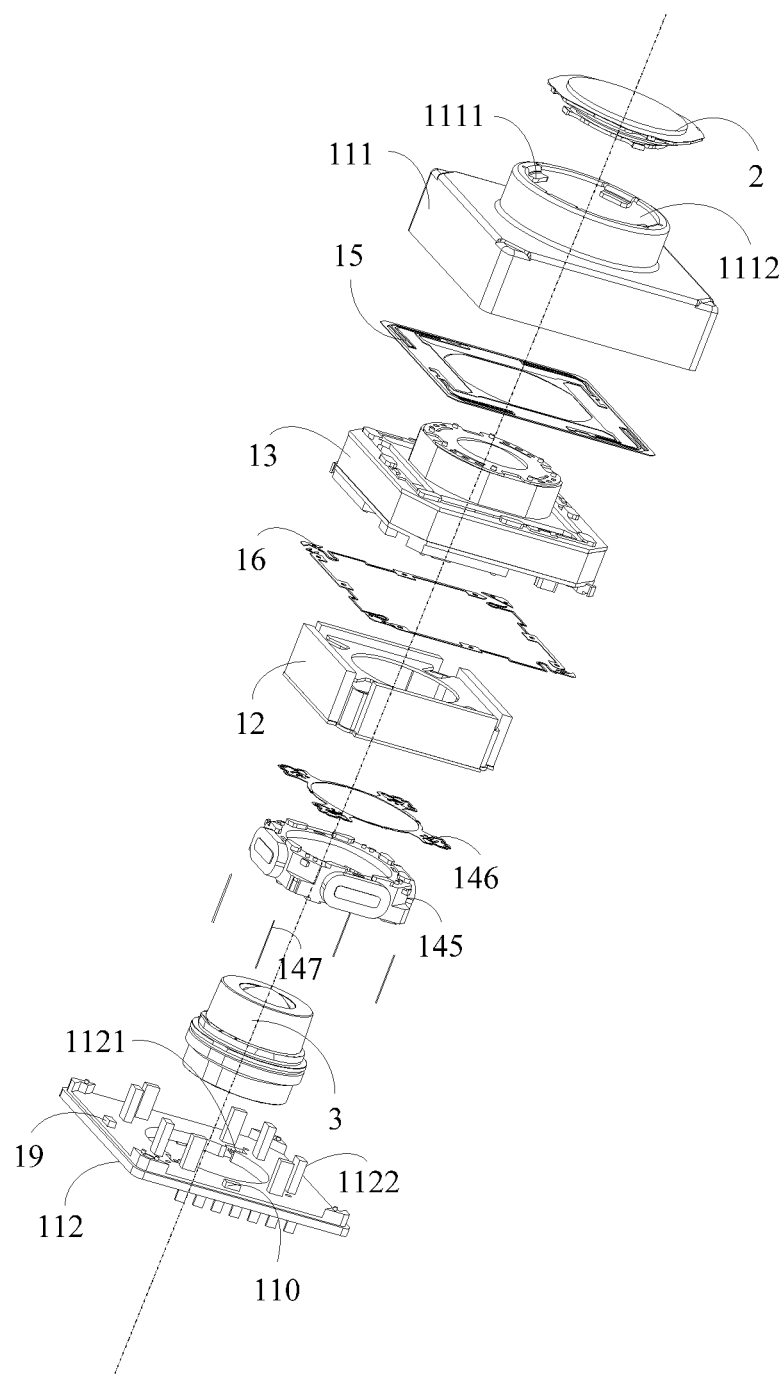
FIG. 3 is an exploded view of the camera unit in FIG. 1.

FIG. 1 is a top view of a camera unit 100 according to an illustrative embodiment, FIG. 2 is a sectional view of the camera unit 100 in FIG. 1, and FIG. 3 is an exploded view of the camera unit 100 in FIG. 1. As shown in FIGS. 1 to 3, the camera unit 100 may include an actuator 1, a fluid lens 2, and a first lens 3. The first lens 3 is a conventional solid-state lens that is different from the fluid lens 2. For example, the first lens 3 may include a prime lens. A fluid in the fluid lens 2 may include but is not limited to fluids such as a liquid metal, a gel, a liquid, and a gas. When the fluid in the liquid lens 2 is a liquid, the fluid lens 2 is a liquid lens. The actuator 1 may include a seat 11, and both the first lens 3 and the fluid lens 2 may be assembled to the seat 11. For example, in the embodiment of FIG. 1, the first lens 3 and the fluid lens 2 may be arranged along a first direction of the seat 11. That is, as shown in FIG. 2, the first lens 3 and the fluid lens 2 may be assembled to the seat 11 along a direction indicated by an arrow A in FIG. 2, and the first direction may correspond to an optical axis direction of the camera unit 100.

It can be understood that, in order to improve the imaging effect of the camera unit 100, the auto focusing and optical image stabilization can be achieved through the actuator 1, so as to achieve the purpose of imaging with a high resolution. Based on this requirement, in the technical solution of the present disclosure, the actuator 1 may further include a stator assembly 12, a focusing mover assembly 13, and an anti-shake mover assembly 14. The stator assembly 12 may be assembled in the seat 11 and fixedly connected with the seat 11. The focusing mover assembly 13 and the anti-shake mover assembly 14 are also arranged in the seat 11. Different from the stator assembly 12, the focusing mover assembly 13 and the anti-shake mover assembly 14 can move relative to the seat 11, so as to achieve the purpose of auto focusing and optical image stabilization.

For example, through the interaction between the stator assembly 12 and the focusing mover assembly 13, a force acting on the focusing mover assembly 13 in the first direction can be generated, and the focusing mover assembly 13 can move in the first direction of the seat 11. Thus, the fluid lens 2 can be squeezed and the fluid in the fluid lens 2 flows, so as to achieve the purpose of adjusting a curvature of the fluid lens 2, thus achieving the focusing. Through the interaction between the stator assembly 12 and the anti-shake mover assembly 14, the anti-shake mover assembly 14 can be translated in a plane perpendicular to the first direction, so as to drive the first lens 3 to move, thus realizing the anti-shake of the camera unit 100.

It can be seen from the above embodiments that in the technical solution of the present disclosure, the interaction between the focusing mover assembly 13 and the stator assembly 12 can cause the curvature of the fluid lens 2 to change so as to achieve the purpose of focusing, and through the interaction between the anti-shake mover assembly 14 and the stator assembly 12, the relative position relationship between the first lens 3 and the fluid lens 2 can be changed by adjusting the position of the first lens 3, so as to achieve the purpose of optical image stabilization. Thus, the focusing function and the anti-shake function of the camera unit 100 can be achieved independently. Compared with the related art, the mutual influence between the focusing process and the anti-shake process can be avoided, which is beneficial to improving the image quality.

In the technical solution of the present disclosure, the focusing mover assembly 13 can be arranged on an outer side of the stator assembly 12 around the first direction, the anti-shake mover assembly 14 can be arranged on an inner side of the stator assembly 12 around the first direction, and the first lens 3 is arranged on a side of the anti-shake mover assembly 14 facing away from the stator assembly 12. Based on this, the focusing mover assembly 13, the stator assembly 12, the anti-shake mover assembly 14 and the first lens 3 are assembled in the form of multi-layer lantern rings, which is beneficial to reducing the overall height of the camera unit 100, thus facilitating an internal layout of an electronic device provided with the camera unit 100. Of course, in the embodiments of the present disclosure, the form of lantern rings is taken as an example for illustration. In other embodiments, the focusing mover assembly 13 and the stator assembly 12 may be arranged along the first direction, and the anti-shake mover assembly 14 is arranged on the inner side of the stator assembly 12. Or, the focusing mover assembly 13 is arranged on the outer side of the stator assembly 12, and the anti-shake mover assembly 14 and the stator assembly 12 are arranged along the first direction. That is, the whole is designed in such a manner that the focusing mover assembly 13 can move in the first direction, and the anti-shake mover assembly 14 can translate in a plane perpendicular to the optical axis, which is not limited in the present disclosure. Similarly, in some other embodiments, the first lens 3 and the anti-shake mover assembly 14 may also be arranged along the first direction, which is not limited in the present disclosure. In the embodiments of the present disclosure, the interaction of the same stator assembly 12 with the focusing mover assembly 13 and the anti-shake mover assembly 14 is taken as an example for illustration. In some other possible embodiments, the focusing mover assembly 13 and the anti-shake mover assembly 14 can also interact with different stator assemblies 12.

As shown in FIGS. 2 and 3, the first direction is the optical axis direction of the camera unit 100, the focusing mover assembly 13 is arranged on the outer side of the stator assembly 12 and surrounds the stator assembly 12, and the anti-shake mover assembly 14 is arranged on the inner side of the stator assembly 12 and surrounded by the stator assembly 12.

Regarding the interaction between the stator assembly 12 and the focusing mover assembly 13, and the interaction between the stator assembly 12 and the anti-shake mover assembly 14, for example, the stator assembly 12 may include a first acting member, the focusing mover assembly 13 may include a second acting member, and the anti-shake mover assembly 14 may include a third acting member. The first acting member interacts with the second acting member to push the focusing mover assembly 13 to move in the first direction. The first acting member interacts with the third acting member so that the anti-shake mover assembly 14 translates in the plane perpendicular to the first direction.

The first acting member, the second acting member, and the third acting member may include various structures, which will be illustrated as follows.

In some possible embodiments, the first acting member may include a stator magnet, and the second acting member of the focusing mover assembly 13 may include a focusing coil 131. The focusing coil 131 and the fluid lens 2 are arranged along the first direction. After the camera unit 100 receives a focusing instruction, the focusing coil 131 can be energized. Then, the focusing coil 131 can interact with the stator magnet of the stator assembly 12 to generate the force in the first direction, the focusing mover assembly 13 is pushed to move towards the fluid lens 2 by the force, and the fluid lens 2 is squeezed and hence deformed to change the curvature of the fluid lens 2, thus achieving the purpose of focusing. The third acting member of the anti-shake mover assembly 14 may include an anti-shake coil. The anti-shake mover assembly 14 is also assembled with the first lens 3. When the camera unit 100 receives an anti-shake instruction, the anti-shake coil can be energized. Then, the anti-shake coil interacts with the stator magnet of the stator assembly 12 to generate a force perpendicular to the first direction, and the anti-shake mover assembly 14 is pushed by the force to translate in the plane perpendicular to the first direction relative to the seat 11, so as to adjust the relative position relationship between the first lens 3 and the fluid lens 2, and to compensate for image blur caused by shaking of a user during photo-shooting, thus achieving the purpose of optical image stabilization.

In some other possible embodiments, the first acting member of the stator assembly 12 may also include a stator coil, the second acting member of the focusing mover assembly 13 may include a focusing magnet, and the third acting member of the anti-shake mover assembly 14 may include an anti-shake magnet. By properly setting a direction of a magnetic induction line of the focusing magnet, a N pole and a S pole of the anti-shake magnet, and a current direction in the stator coil, it is possible to push the focusing mover assembly 13 to move along the first direction when the stator coil interacts with the focusing magnet, and also to push the anti-shake mover assembly 14 to translate in the plane perpendicular to the first direction through the interaction between the stator coil and the anti-shake magnet.

For example, the stator assembly 12 may include the first acting member and an annual bracket 121. The annual bracket 121 is fixedly connected to the seat 11. The first acting member is arranged to the annular bracket 121 along a circumferential direction of the annular bracket 121.

For example, the focusing mover assembly 13 may include the second acting member, a first mounting base 132, and a first connecting sheet 133. The first mounting base 132 may be arranged in the seat 11. The first mounting base 132 may include a first through hole 1321, and the stator assembly 12 may be arranged in the first through hole 1321. The second acting member may be arranged on an outer side of the first mounting base 132 along a circumferential direction of the first mounting base 132. The first connecting sheet 133 is connected to the first mounting base 132 in the first direction, and the first connecting sheet 133 is configured to be connected to the fluid lens 2.

For example, the anti-shake mover assembly 14 may include the third acting member and a second mounting base 145, and the second mounting base 145 may be arranged in the seat 11. The second mounting base 145 may be arranged on the inner side of the stator assembly 12. The second mounting base 145 may include a second through hole 1451, and the first lens 3 may be arranged in the second through hole 1451 and assembled with the second mounting base 145. The third acting member may be arranged on a side of the second mounting base 145 facing the stator assembly 12 along a circumferential direction of the second mounting base 145.

For example, one integral third acting member may be arranged on the side of the second mounting base 145 facing the stator assembly 12 along the circumferential direction of the second mounting base 145.

Or, more than one third acting member may be arranged at intervals on the side of the second mounting base 145 facing the stator assembly 12 along the circumferential direction of the second mounting base 145. For example, the anti-shake mover assembly 14 may also include a second connecting sheet 146 and a suspension wire 147. The second connecting sheet 146 is connected to an end of the second mounting base 145. One end of the suspension wire 147 may be connected to the second connecting sheet 146, and the other end of the suspension wire 147 may be connected to an end of the seat 11. The end of the second mounting base 145 and the end of the seat 11 are arranged opposite to each other along the first direction of the seat 11.

In order to describe the embodiments of the present disclosure in detail, the following illustration is made by taking an example in which the first acting member includes the stator magnet, the second acting member includes the focusing coil, and the third acting member includes the anti-shake coil. For example, more than one first acting member (two or more first acting members) may be provided, that is, more than one stator magnets may be provided, and the more than one stator magnets are arranged on the annual bracket 121 along a circumferential direction of the annual bracket 121. For example, the number of the first acting members may be 4, that is, four stator magnets may be provided in this example.

In other embodiments, one stator magnet may also be provided, as long as the stator magnet can interact with the focusing coil 131 and the anti-shake coil to move the focusing mover assembly 13 and the anti-shake mover assembly 14, respectively, as described above.

Figure 4:
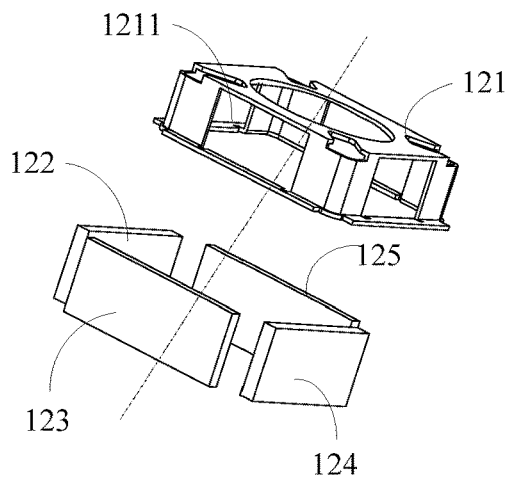
FIG. 4 is an exploded view of a stator assembly according to an illustrative embodiment of the present disclosure.
Figure 5:
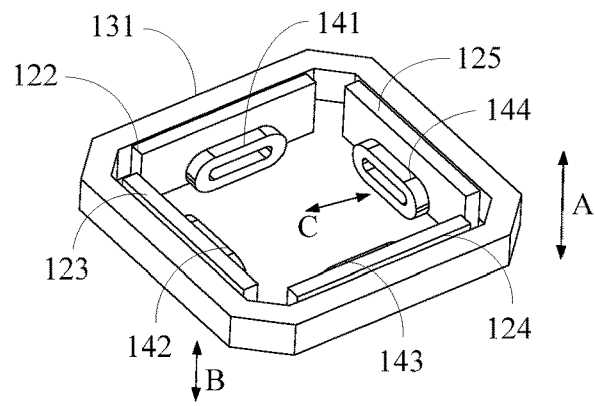
FIG. 5 is a schematic view illustrating a position relationship of a stator magnet, a focusing coil and an anti-shake coil of the stator assembly in FIG. 4.

As shown in FIG. 4, the stator assembly 12 may include the annular bracket 121, four stator magnets are provided and include a first stator magnet 122, a second stator magnet 123, a third stator magnet 124, and a fourth stator magnet 125. The first stator magnet 122, the second stator magnet 123, the third stator magnet 124 and the fourth stator magnet 125 are arranged on the annular bracket 121 along a circumferential direction of the annular bracket 121. The focusing mover assembly 13 is located on an outer side of the annular bracket 121, and the anti-shake mover assembly 14 is located on an inner side of the annular bracket 121. Based on this, as shown in FIG. 5, the focusing coil 131 is located on the outer side of the annular bracket 121, and the anti-shake coil is located on the inner side of the annular bracket 121. The sides of the first stator magnet 122, the second stator magnet 123, the third stator magnet 124 and the fourth stator magnet 125 facing the anti-shake mover assembly 14 each have a first polarity, and the other sides of the first stator magnet 122, the second stator magnet 123, the third stator magnet 124 and the fourth stator magnet 125 facing the focusing mover assembly 13 each have a second polarity.

The first stator magnet 122, the second stator magnet 123, the third stator magnet 124, and the fourth stator magnet 125 each can interact with the focusing coil 131 to generate the force along the first direction so as to realize the movement of the focusing mover assembly 13. The first stator magnet 122, the second stator magnet 123, the third stator magnet 124 and the fourth stator magnet 125 each can also interact with the anti-shake coil to generate the force perpendicular to the first direction so as to push the anti-shake mover assembly 14 to translate. In the embodiments of the present disclosure, the stator assembly 12 including the first stator magnet 122, the second stator magnet 123, the third stator magnet 124, and the fourth stator magnet 125 is only taken as an example for illustration. In some other embodiments, the stator assembly 12 may also include other numbers of stator magnets, which is not limited in the present disclosure.

For example, the annular bracket 121 may include an annular magnetic-conductive bracket. Since the first stator magnet 122, the second stator magnet 123, the third stator magnet 124, and the fourth stator magnet 125 are arranged at intervals on the annular magnetic-conductive bracket, the magnetism of each stator magnet can extend beyond its both ends, so that a portion of the annular magnetic-conductive bracket that is not provided with the stator magnet is also magnetic, and can interact with the focusing coil 131, which can increase the uniformity of the force acting on the focusing mover assembly 13 in the first direction.

In some possible embodiments, the annular bracket 121 may include more than one opening 1211 arranged at intervals along the circumferential direction of the annular bracket 121, and the more than one opening 1211 are arranged in a one-to-one correspondence with the more than one stator magnet. For example, the more than one opening 1211 may be arranged in a one-to-one correspondence with the first stator magnet 122, the second stator magnet 123, the third stator magnet 124, and the fourth stator magnet 125, so as to avoid a partition from existing between the stator magnet and the anti-shake coil, thus not affecting the anti-shake effect. When the stator assembly 12 includes other numbers of stator magnets, these stator magnets may be arranged in a one-to-one correspondence with the openings 1211 in the annual bracket 121.

In the other embodiments where one stator magnet is provided, one opening 1211 may also be provided accordingly so as to correspond with the stator magnet.

In order to facilitate the understanding of the technical solution of the present disclosure, the implementation of the focusing function and the anti-shake function is illustrated in the following by taking an example in which the first polarity is the S pole and the second polarity is the N pole.

For the focusing function of the camera unit 100, since the side of each stator magnet facing the focusing mover assembly may be the N pole, and the side of each stator magnet facing the anti-shake mover assembly 14 may be the S pole, the magnetic induction lines of the first stator magnet 122, the second stator magnet 123, the third stator magnet 124 and the fourth stator magnet 125 are each directed from the side of the corresponding magnet facing the focusing mover assembly to the side of the corresponding magnet facing the anti-shake mover assembly 14. A direction of a central axis of the focusing coil 131 is parallel to the first direction, and polarity arrangement directions of the first stator magnet 122, the second stator magnet 123, the third stator magnet 124, and the fourth stator magnet 125 are perpendicular to the first direction. The polarity arrangement direction is an arrangement direction of the N pole and the S pole of the stator magnet. The focusing coil 131 may be formed by a conductive wire wound around the direction of the central axis (i.e., a direction shown by an arrow B in FIG. 5) in multiple turns, so that an energizing current in the focusing coil 131 flows around the direction of the central axis of the focusing coil 131. Based on this, when the focusing instruction is received, the focusing coil 131 is energized. According to the left-hand rule, the focusing coil 131 interacts with the first stator magnet 122, the second stator magnet 123, the third stator magnet 124, and the fourth stator magnet 125 to generate an upward force in the first direction respectively, and then the focusing mover assembly 13 is pushed to move towards the fluid lens 2 as a whole, so as to squeeze the fluid lens 2 and adjust the curvature of the fluid lens 2, thus achieving the purpose of focusing. Or, by adjusting the current direction in the focusing coil 131, the focusing coil 131 interacts with the first stator magnet 122, the second stator magnet 123, the third stator magnet 124, and the fourth stator magnet 125 to generate a downward force in the first direction respectively, then the focusing mover assembly 13 is reset, and the deformation of the fluid lens 2 is restored.

The polarity arrangement direction is an arrangement direction of the N pole and the S pole of the stator magnet. For example, the polarity arrangement direction is an arrangement direction from the N pole to the S pole of the stator magnet or an arrangement direction from the S pole to the N pole of the stator magnet.

Figure 6:
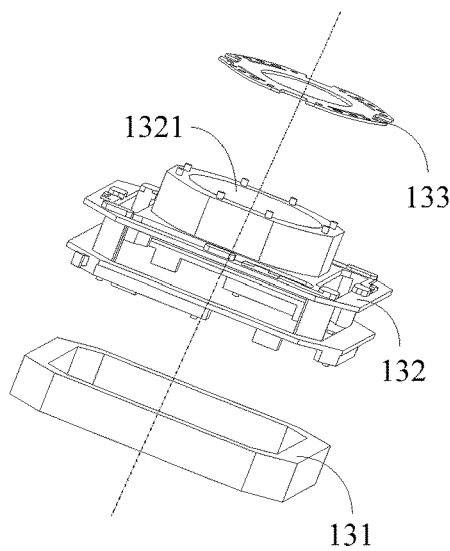
FIG. 6 is an exploded view of a focusing mover assembly according to an illustrative embodiment of the present disclosure.

As shown in FIG. 6, the focusing mover assembly 13 may also include the first mounting base 132 and the first connecting sheet 133, the first mounting base 132 may be arranged in the seat 11, the first mounting base 132 may include the first through hole 1321, and the stator assembly 12 may be arranged in the first through hole 1321. The focusing coil 131 may be arranged on the outer side of the first mounting base 132 along the circumferential direction of the first mounting base 132, so that the focusing coil 131 can be arranged corresponding to the first stator magnet 122, the second stator magnet 123, the third stator magnet 124, and the fourth stator magnet 125. Of course, in order to strengthen the force generated by the interaction between the focusing coil 131 and the first stator magnet 122, the second stator magnet 123, the third stator magnet 124, and the fourth stator magnet 125, the first mounting base 132 may also include more than one opening, and the first stator magnet 122, the second stator magnet 123, the third stator magnet 124, and the fourth stator magnet 125 may be arranged corresponding to the respective openings, so that there are no other obstacles between the focusing coil 131 and the first stator magnet 122, the second stator magnet 123, the third stator magnet 124 and the fourth stator magnet 125, and hence the force for pushing the focusing mover assembly 13 to move in the first direction is enhanced.

Figure 7:
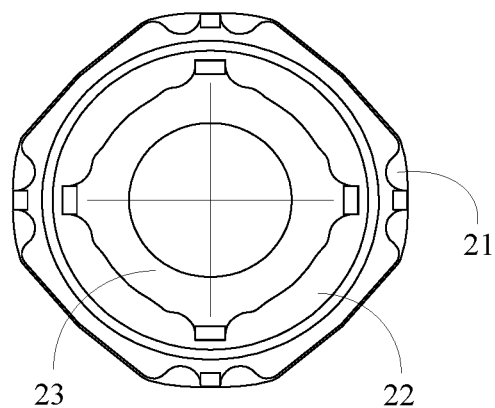
FIG. 7 is a schematic view of a fluid lens according to an illustrative embodiment of the present disclosure.

The first connecting sheet 133 may be arranged to the first mounting base 132 along the first direction, and the first connecting sheet 133 may be configured to be connected with the fluid lens 2, so that when the focusing mover assembly 13 moves toward the fluid lens 2, the first connecting sheet 133 can act on the liquid lens, thus causing the curvature of the fluid lens 2 to change. For example, as shown in FIG. 7, the fluid lens 2 may include a fixed frame 21, a diaphragm 22, and a movable sheet 23. The diaphragm 22 is connected to the fixed frame 21, and the liquid may be provided between the diaphragm 22 and the fixed frame 21. The movable sheet 23 is connected with the diaphragm 22, and the movable sheet 23 is also connected with the first connecting sheet 133, so that when the first connecting sheet 133 moves towards the fluid lens 2, the movable sheet 23 can be pushed by the first connecting sheet 133 to move, so as to cause the liquid between the fixed frame 21 and the diaphragm 22 to flow, thus adjusting the curvature of the fluid lens 2.

Of course, after the focusing mover assembly 13 completes the focusing, or after the photo-shooting is completed, the focusing mover assembly 13 needs to be reset, so that the focusing mover assembly 13 can subsequently interact with the stator assembly 12 for focusing again. Therefore, in order to reset the focusing mover assembly 13, the actuator 1 may further include a first elastic sheet 15 and a second elastic sheet 16. The first elastic sheet 15 may be arranged between the seat 11 and the first mounting base 132 along the circumferential direction of the first mounting base 132, and the first elastic sheet 15 may be fixedly connected to the first mounting base 132 and the seat 11 respectively, for example, being fixed by welding. Similarly, the second elastic sheet 16 may be arranged between the seat 11 and the first mounting base 132 along the circumferential direction of the first mounting base 132, and the second elastic sheet 16 is fixedly connected to the first mounting base 132 and the seat 11 respectively, for example, being fixed by welding. The first elastic sheet 15 and the second elastic sheet 16 are arranged along the first direction, and there is a certain distance between the first elastic sheet 15 and the second elastic sheet 16 in the first direction. Based on this, the focusing mover assembly 13 can be suspended between the stator assembly 12 and the seat 11 through the action of the first elastic sheet 15 and the second elastic sheet 16. When the focusing mover assembly 13 moves towards the fluid lens 2 in the first direction, the first elastic sheet 15 and the second elastic sheet 16 will be caused to deform, so that after the focusing coil 131 is powered off, the focusing coil 131 is not subject to an external force, and thus can be reset under the action of the first elastic sheet 15 and the second elastic sheet 16. Further, due to the action of the first elastic sheet 15 and the second elastic sheet 16, the focusing mover assembly 13 can be reset to the same position after each focusing. Moreover, through the action of the first elastic sheet 15 and the second elastic sheet 16, the movement of the focusing mover assembly 13 in the plane perpendicular to the first direction can be restricted.

Regarding the anti-shake function of the camera unit 100, as an illustrative illustration, the anti-shake mover assembly 14 may include the anti-shake coil that interacts with the stator magnet of the stator assembly 12. Still taking the embodiment of the present disclosure, in which the stator magnet includes the first stator magnet 122, the second stator magnet 123, the third stator magnet 124, and the fourth stator magnet 125, as an example, the anti-shake coil may include a first anti-shake coil 141, a second anti-shake coil 142, a third anti-shake coil 143 and a fourth anti-shake coil 144 correspondingly. The first anti-shake coil 141 is arranged corresponding to the first stator magnet 122, the second anti-shake coil 142 is arranged corresponding to the second stator magnet 123, the third anti-shake coil 143 is arranged corresponding to the third stator magnet 124, and the fourth anti-shake coil 144 is arranged corresponding to the fourth stator magnet 125. A direction of a central axis of each anti-shake coil is perpendicular to the first direction, that is, the direction of the central axis of each anti-shake coil (i.e., a direction shown by an arrow C in FIG. 5) is parallel to the polarity arrangement direction of the corresponding stator magnet. An energized current in each anti-shake coil flows around the direction of the central axis of the anti-shake coil. Based on this, after any anti-shake coil is energized, a magnetic field may be generated around the anti-shake coil. By controlling a direction of the current in each anti-shake coil, a side of the anti-shake coil facing the stator magnet 122 may be the S pole or the N pole. Since the sides of the first stator magnet 122, the second stator magnet 123, the third stator magnet 124, and the fourth stator magnet 125 facing the anti-shake mover assembly 14 are all the S poles, a repulsive force or an attractive force is generated between the anti-shake coil and the stator magnet, so that the anti-shake mover assembly 14 is pushed to move away from the stator magnet corresponding to any anti-shake coil in the plane perpendicular to the first direction, or the anti-shake mover assembly 14 is attracted to move in a direction of approaching the stator magnet corresponding to any anti-shake coil in the plane perpendicular to the first direction. For example, by controlling the energization, the de-energization, the current direction and the current magnitude of the anti-shake coil in the magnetic fields of the more than one stator magnet, the magnitude and direction of the force acting on the anti-shake mover assembly 14 can be adjusted, and thus the compensation can be made in various directions, improving the practicality of the anti-shake function.

In the above embodiment, the anti-shake coils and the stator magnets having the one-to-one correspondence are only taken as an example for illustration. In other embodiments, a single stator magnet can correspond to more than one anti-shake coil, and the directions of the energized currents in the more than one anti-shake coil corresponding to the same stator magnet are identical, so that the directions of the generated forces are identical. In the above embodiment, the first stator magnet 122 and the third stator magnet 124 are arranged opposite to each other, the second stator magnet 123 and the fourth stator magnet 125 are arranged opposite to each other, and the polarity arrangement directions of two adjacent stator magnets are orthogonal to each other. Based on this, the forces parallel to the plane perpendicular to the first direction and orthogonal to each other are generated, so as to push the anti-shake mover assembly 14 to translate in various directions in the plane perpendicular to the first direction, thus realizing shake compensation in various directions. In some other possible embodiments, there may also be at least one group of stator magnets with orthogonal polarity arrangement directions in the more than one stator magnet, so that the forces parallel to the plane perpendicular to the first direction and orthogonal to each other are generated, and also the shake compensation in various directions can be achieved, which can be specifically designed as required, and is not limited in the present disclosure.

Herein, it should be noted that "orthogonal" may be interpreted as "perpendicular", and can be exchanged without contradiction.

Figure 8:
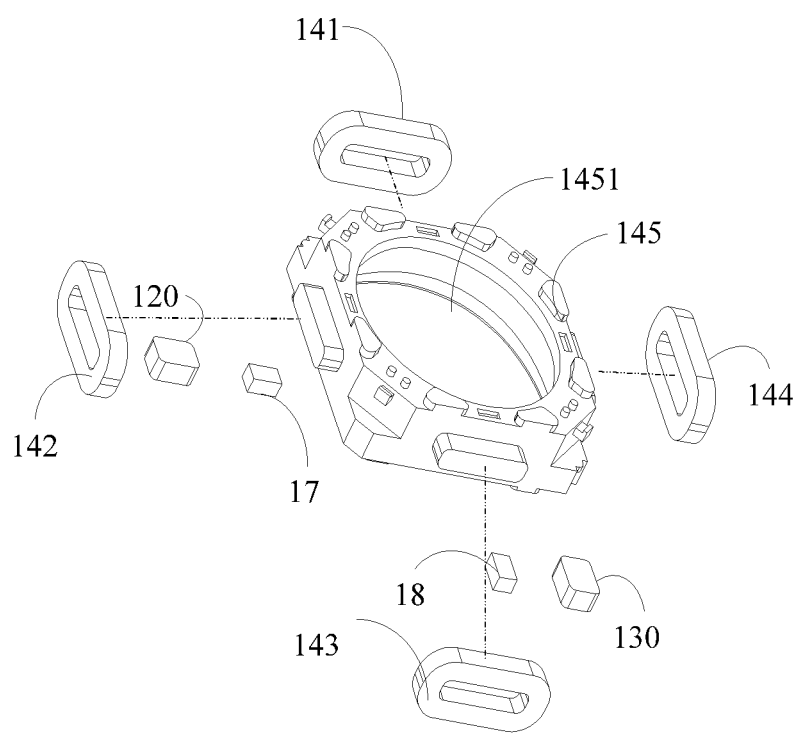
FIG. 8 is a partial exploded view of a camera unit according to an illustrative embodiment of the present disclosure.

As shown in FIG. 8, the anti-shake mover assembly 14 may include a second mounting base 145, and the second mounting base 145 may be arranged in the seat 11. The second mounting base 145 may be arranged on the inner side of the stator assembly 12, and the second mounting base 145 may include the second through hole 1451. The first lens 3 is arranged in the second through hole 1451 and assembled with the second mounting base 145. The first anti-shake coil 141, the second anti-shake coil 142, the third anti-shake coil 143 and the fourth anti-shake coil 144 may be arranged at intervals on an outer side of the second mounting base 145 along a circumferential direction of the second mounting base 145, so that the first anti-shake coil 141, the second anti-shake coil 142, the third anti-shake coil 143, and the fourth anti-shake coil 144 can correspond to the stator magnets in the stator assembly 12, respectively. For example, the anti-shake mover assembly 14 may also include the second connecting sheet 146 and the suspension wire 147. The second connecting sheet 146 is connected to the end of the second mounting base 145. One end of the suspension wire 147 may be connected to the second connecting sheet 146, and the other end of the suspension wire 147 may be connected to the end of the seat 11. The end of the second mounting base 145 and the end of the seat 11 are arranged opposite to each other along the first direction of the seat 11, so that the suspension wire 147 can be arranged along the first direction, and the suspension wire 147 has a larger rigidity in the first direction than in a second direction perpendicular to the first direction. Thus, when the stator assembly 12 and the anti-shake mover assembly 14 interact with each other to generate the force, since the rigidity of the suspension wire 147 is weak in the second direction perpendicular to the first direction, the anti-shake mover assembly 14 can drive the first lens 3 to move in the plane perpendicular to the first direction, and since the rigidity of the suspension wire 147 in the first direction is relatively strong, the movements of the anti-shake mover assembly 14 and the first lens 3 in the first direction can be reduced, and thus the interference to the focusing function can be reduced.

In order to realize a closed-loop control of the anti-shake function, in the embodiments of the present disclosure, the actuator 1 may also include a Hall magnet and a Hall sensor, the Hall magnet and the Hall sensor may be arranged in a one-to-one correspondence, one of the Hall sensor and the Hall magnet may be connected to the anti-shake mover assembly 14, and the other one of the Hall sensor and the Hall magnet may be connected to the seat 11, so that a position and a displacement of the anti-shake mover assembly 14 can be calculated according to a change of a magnetic field intensity detected by the Hall sensor, and then it is determined whether the shake compensation has been completed currently. For example, taking the embodiment of the present disclosure as an example, the Hall magnet may include a first Hall magnet 17 and a second Hall magnet 18, and both the first Hall magnet 17 and the second Hall magnet 18 may be connected with the second mounting base 145 of the anti-shake mover assembly 14. The polarity arrangement directions of the first Hall magnet 17 and the second Hall magnet 18 may be parallel to the first direction, and extension directions of the first Hall magnet 17 and the second Hall magnet 18 are orthogonal to each other, so that the Hall sensor can detect the displacement of the anti-shake mover assembly 14 in the orthogonal directions, so as to obtain a coordinate position of the anti-shake mover assembly 14.

The Hall sensor may also include a first Hall sensor 19 and a second Hall sensor 110 connected to the seat 11. The first Hall magnet 17 is arranged corresponding to the first Hall sensor 19, and the second Hall magnet 18 is arranged corresponding to the second Hall sensor 110. When the anti-shake mover assembly 14 moves, a relative position relationship between the first Hall magnet 17 and the first Hall sensor 19, and a relative position relationship between the second Hall magnet 18 and the second Hall sensor 110 change. The first Hall sensor 19 and the second Hall sensor 110 can detect the change of the magnetic field intensity, the real-time position of the anti-shake mover assembly 14 can be obtained according to the change of the magnetic field intensity, so as to realize the displacement control of the anti-shake mover assembly 14 and improve the accuracy of the anti-shake function. In order to reduce the interference of the Hall magnet to the stator assembly 12, the actuator 1 may also include a shielding cover, the Hall magnet may be arranged in the shielding cover, and the shielding cover and the Hall magnet may both be connected to the seat 11 or the anti-shake mover assembly 14. For example, in the embodiments of the present disclosure, the shielding cover may include a first shielding cover 120 and a second shielding cover 130, and the first shielding cover 120 and the second shielding cover 130 are both connected to the second mounting base 145. The first Hall magnet 17 may be arranged in the first shielding cover 120 and connected to the second mounting base 145, and the second Hall magnet 18 may be arranged in the second shielding cover 130 and connected to the second mounting base 145.

It should be noted that in the above embodiment, the actuator 1 including the first Hall magnet 17, the second Hall magnet 18, the first Hall sensor 19, and the second Hall sensor 110 is taken as an example for illustration. In other embodiments, the actuator 1 may also include other numbers of Hall magnets and other numbers of Hall sensors, and the Hall sensors and the Hall magnets are arranged in a one-to-one correspondence. When the actuator 1 includes more than one Hall magnet, the polarity arrangement directions of the more than one Hall magnet may all be parallel to the first direction, and the extension directions of at least two of the Hall magnets are orthogonal to each other, so that they can detect the displacement of the anti-shake mover assembly 14 in the orthogonal directions, so as to obtain the coordinate position of the anti-shake mover assembly 14. In the above embodiment, in order to detect the displacement of the anti-shake mover assembly 14 in the orthogonal directions, the technical solution is proposed, in which the polarity arrangement directions of the more than one Hall magnet can all be parallel to the first direction, and the extension directions of at least two of the Hall magnets are orthogonal to each other. In other embodiments, the polarity arrangement direction of each of the more than one Hall magnet included in the actuator 1 may be perpendicular to the first direction, and the polarity arrangement directions of at least two of the Hall magnets are perpendicular to each other, so that the displacement of the anti-shake mover assembly 14 can also be detected in the orthogonal directions. In the above embodiments, the Hall magnet connected to the second mounting base 145 and the Hall sensor connected to the seat 11 are taken as an example for illustration. In other embodiments, the Hall magnet may also be connected to the seat 11. For example, the Hall magnet and the seat 11 are fixedly connected directly. Or, the Hall magnet and the seat 11 are fixedly connected indirectly. For example, the Hall magnet may be connected to the annular bracket 121, the annular bracket 121 is connected to the seat 11, and the Hall sensor is connected to the second mounting base 145, which is not limited in the present disclosure.

In the above embodiments, the first acting member including the stator magnet, the second acting member including the focusing coil, and the third acting member including the anti-shake coil are taken as an example for illustration. For an embodiment in which the first acting member includes a stator coil, the second acting member includes a focusing magnet, and the third acting member includes an anti-shake magnet, the stator coil of the stator assembly 12 may be arranged on a side of the annular bracket 121 facing the focusing mover assembly 13 along the circumferential direction of the annular bracket 121, the focusing magnet may be arranged on the outer side of the stator coil along the circumferential direction of the first mounting base 132, and the anti-shake magnet may be arranged on the inner side of the stator coil along the circumferential direction of the second mounting base 145. The focusing magnet may include an annular magnet or more than one block magnet arranged around the outer side of the stator coil, and the anti-shake mover assembly 14 may include more than one anti-shake magnet arranged around the inner side of the stator coil. Based on this, by reasonably setting the N pole and S pole of the focusing magnet, the N pole and S pole of the anti-shake magnet, and the current direction in the stator coil, the focusing mover assembly 13 can be pushed to move in the first direction to squeeze the fluid lens 2, and the anti-shake mover assembly 14 can be pushed to move in the plane perpendicular to the first direction. In this embodiment, other structures of the focusing mover assembly 13 and other structures of the anti-shake mover assembly 14 can refer to the foregoing embodiments, and will not be repeated herein.

In each of the above embodiments, the seat 11 may include a cover 111 and a base plate 112 assembled with the cover 111. The cover 111 may include a mounting cavity 1112, the stator assembly 12, the focusing mover assembly 13, and the anti-shake mover assembly 14 are arranged in the mounting cavity 1112, and the cover 111 may also be configured to be connected with the fluid lens 2. The base plate 112 may be assembled with the cover 111 to seal an end of the mounting cavity 1112, and the base plate 112 may also be connected with the stator assembly 12 to achieve the fixation of the stator assembly 12. For example, the base plate 112 may include a mounting post 1122, the annular bracket 121 of the stator assembly 12 may include a mounting hole, and the mounting post 1122 may be assembled in the mounting hole, so as to realize the assembling of the base plate 112 and the stator assembly 12. In other embodiments, it is also possible that the base plate 112 includes the mounting hole, and the annular bracket 121 of the stator assembly 12 includes the mounting post 1122, which is not limited in the present disclosure.

For example, the fluid lens 2 may be connected to the cover 111, and the cover 111 may include more than one fixing stage 1111 arranged on a side of the cover 111 facing away from the base plate 112, and the more than one fixing stage 1111 may be arranged along a circumferential direction of the mounting cavity 1112. The fixing stage 1111 may be connected with the fixed frame 21 of the fluid lens 2 to realize the assembling of the fluid lens 2 and the seat 11. Further, through the joint action of the more than one fixing stage 1111, the uniformity of the force applied to the fluid lens 2 can be improved, and the deformation of the fluid lens 2 itself due to its mounting can be avoided. The first lens 3 may be arranged adjacent to the base plate 112. The base plate 112 includes a mounting groove 1121, and the Hall sensor interacting with the Hall magnet on the anti-shake mover assembly 14 may be arranged in the mounting groove 1121. Of course, when the anti-shake mover assembly 14 includes the Hall sensor, the Hall magnet and the corresponding shielding cover may be fixed by the mounting groove 1121, which may be specifically designed as required, and is not limited in the present disclosure. In order to supply power to the focusing coil 131 and the anti-shake coil, the base plate 112 may include a plastic lid (not shown) and a metal terminal (not shown) arranged to the plastic lid. The metal terminal may be in direct or indirect conduction with the focusing coil 131 and the anti-shake coil, so as to realize the power on or power off. Insulation may be achieved through the plastic lid to reduce the risk of short circuit. Both the mounting groove 1121 and the mounting post 1122 may be arranged on the plastic lid.

Based on the technical solution of the present disclosure, the present disclosure also provides an electronic device. The electronic device may include the camera unit 100 described in one or more of the above embodiments. Image information can be obtained through the camera unit 100. Moreover, since the focusing function and the anti-shake function can be implemented independently, the interference between the two functions can be reduced.

Other embodiments of the present disclosure will be apparent to those skilled in the art from consideration of the specification and practice of the present disclosure disclosed herein. This application is intended to cover any variations, uses, or adaptations of the present disclosure following the general principles thereof and including such departures from the present disclosure as come within known or customary practice in the art. It is intended that the specification and examples should be considered as illustrative only, with a true scope and spirit of the present disclosure being indicated by the following claims.

It will be appreciated that the present disclosure is not limited to the exact construction that has been described above and illustrated in the accompanying drawings, and various modifications and changes may be made without departing from the scope thereof. It is intended that the scope of the present disclosure only be limited by the appended claims.

The invention claimed is:

1. An actuator for a camera unit, comprising:
a seat configured to be assembled with a first lens and a fluid lens of the camera unit;
a stator assembly fixedly connected to the seat;
a focusing mover assembly configured to be connected with the fluid lens; and
an anti-shake mover assembly configured to be connected with the first lens,
wherein the focusing mover assembly is configured to move along a first direction of the seat by interacting with the stator assembly, for adjusting a curvature of the fluid lens, and the anti-shake mover assembly is configured to translate in a plane perpendicular to the first direction by interacting with the stator assembly, for driving the first lens to move,
wherein the stator assembly comprises a first acting member, the focusing mover assembly comprises a second acting member, the anti-shake mover assembly comprises a third acting member, the first acting member interacts with the second acting member so that the focusing mover assembly moves in the first direction, and the first acting member interacts with the third acting member so that the anti-shake mover assembly translates in the plane perpendicular to the first direction,
wherein the stator assembly further comprises:
an annular bracket fixedly connected to the seat,
wherein the first acting member is arranged to the annular bracket along a circumferential direction of the annular bracket,
wherein the first acting member comprises a stator magnet, the second acting member comprises a focusing coil, and the third acting member comprises an anti-shake coil,
one or more stator magnets are arranged to the annular bracket along the circumferential direction of the annular bracket,
each stator magnet has a first polarity on a side facing the anti-shake mover assembly, and has a second polarity on a side facing the focusing mover assembly.

2. The actuator according to claim 1, wherein the focusing mover assembly is arranged on an outer side of the stator assembly around the first direction, and the anti-shake mover assembly is arranged on an inner side of the stator assembly around the first direction.

3. The actuator according to claim 1, wherein each stator magnet is arranged corresponding to one or more anti-shake coils, and a direction of a central axis of the anti-shake coil and a polarity arrangement direction of the stator magnet are perpendicular to the first direction.

4. The actuator according to claim 1, wherein the polarity arrangement directions of at least two of the one or more stator magnets are orthogonal to each other.

5. The actuator according to claim 1, wherein a direction of a central axis of the focusing coil is parallel to the first direction, and a polarity arrangement direction of the stator magnet is perpendicular to the first direction.

6. The actuator according to claim 1, wherein the focusing mover assembly comprises:
a first mounting base arranged in the seat and comprising a first through hole, the stator assembly being arranged in the first through hole, and the second acting member being connected to the first mounting base along a circumferential direction of the first mounting base; and
a first connecting sheet connected to the first mounting base along the first direction, and configured to be connected with the fluid lens.

7. The actuator according to claim 6, further comprising:
a first elastic sheet arranged between the seat and the first mounting base along the circumferential direction of the first mounting base, and connected to the seat and the first mounting base respectively; and
a second elastic sheet arranged between the seat and the first mounting base along the circumferential direction of the first mounting base, and connected to the seat and the first mounting base respectively, the second elastic sheet and the first elastic sheet being arranged along the first direction.

8. The actuator according to claim 1, wherein the anti-shake mover assembly comprises:
a second mounting base arranged in the seat and comprising a second through hole, the first lens being configured to be assembled in the second through hole,
wherein the third acting member is arranged on a side of the second mounting base facing the stator assembly along a circumferential direction of the second mounting base.

9. The actuator according to claim 8, wherein the anti-shake mover assembly further comprises:
a second connecting sheet connected to an end of the second mounting base; and
a suspension wire having an end connected to the second connecting sheet and another end connected to an end of the seat, and the end of the second mounting base and the end of the seat being arranged opposite to each other along the first direction,
wherein the suspension wire has a larger rigidity in the first direction than in a second direction, and the second direction is perpendicular to the first direction.

10. The actuator according to claim 1, further comprising:
a Hall magnet; and
a Hall sensor arranged in a one-to-one correspondence with the Hall magnet, one of the Hall sensor and the Hall magnet being connected to the anti-shake mover assembly, and the other one of the Hall sensor and the Hall magnet being connected to the seat.

11. The actuator according to claim 10, wherein the actuator comprises more than one Hall magnets, a polarity arrangement direction of each Hall magnet is parallel to the first direction, and extension directions of at least two of the more than one Hall magnets are orthogonal to each other.

12. The actuator according to claim 10, wherein the actuator comprises more than one Hall magnets, a polarity arrangement direction of each Hall magnet is perpendicular to the first direction, and the polarity arrangement directions of at least two of the more than one Hall magnets are perpendicular to each other.

13. The actuator according to claim 1, wherein the seat comprises:
a cover comprising a mounting cavity, the focusing mover assembly, the anti-shake mover assembly, and the stator assembly being all arranged in the mounting cavity, and the cover being configured to be connected with the fluid lens; and
a base plate assembled with the cover to seal an end of the mounting cavity, and fixedly connected with the stator assembly.

14. The actuator according to claim 13, wherein the cover comprises more than one fixing stages arranged on a side of the cover facing away from the base plate, the more than one fixing stages are arranged along a circumferential direction of the mounting cavity, and the fixing stages are configured to be assembled with the fluid lens.

15. The actuator according to claim 1, wherein the focusing mover assembly, the stator assembly, and the anti-shake mover assembly are assembled in a form of multi-layer lantern rings.

16. A camera unit, comprising:
a fluid lens;
a first lens; and
an actuator comprising:
a seat assembled with the fluid lens and the first lens;
a stator assembly fixedly connected to the seat;
a focusing mover assembly connected with the fluid lens; and
an anti-shake mover assembly connected with the first lens,
wherein the focusing mover assembly is configured to move along a first direction of the seat by interacting with the stator assembly, for adjusting a curvature of the fluid lens, and the anti-shake mover assembly is configured to translate in a plane perpendicular to the first direction by interacting with the stator assembly, for driving the first lens to move,
wherein the stator assembly comprises a first acting member, the focusing mover assembly comprises a second acting member, the anti-shake mover assembly comprises a third acting member, the first acting member interacts with the second acting member so that the focusing mover assembly moves in the first direction, and the first acting member interacts with the third acting member so that the anti-shake mover assembly translates in the plane perpendicular to the first direction,
wherein the focusing mover assembly comprises:
a first mounting base arranged in the seat and comprising a first through hole, the stator assembly being arranged in the first through hole, and the second acting member being connected to the first mounting base along a circumferential direction of the first mounting base; and
a first connecting sheet connected to the first mounting base along the first direction, and configured to be connected with the fluid lens.

17. An electronic device, comprising a camera unit, the camera unit comprising:
a fluid lens;
a first lens; and
an actuator comprising:
a seat assembled with the fluid lens and the first lens;
a stator assembly fixedly connected to the seat;

a focusing mover assembly connected with the fluid lens; and an anti-shake mover assembly connected with the first lens, wherein the focusing mover assembly is configured to move along a first direction of the seat by interacting with the stator assembly, for adjusting a curvature of the fluid lens, and the anti-shake mover assembly is configured to translate in a plane perpendicular to the first direction by interacting with the stator assembly, for driving the first lens to move, wherein the stator assembly comprises a first acting member, the focusing mover assembly comprises a second acting member, the anti-shake mover assembly comprises a third acting member, the first acting member interacts with the second acting member so that the focusing mover assembly moves in the first direction, and the first acting member interacts with the third acting member so that the anti-shake mover assembly translates in the plane perpendicular to the first direction, wherein the anti-shake mover assembly comprises:

a second mounting base arranged in the seat and comprising a second through hole, the first lens being configured to be assembled in the second through hole, wherein the third acting member is arranged on a side of the second mounting base facing the stator assembly along a circumferential direction of the second mounting base, wherein the anti-shake mover assembly further comprises:

a second connecting sheet connected to an end of the second mounting base; and a suspension wire having an end connected to the second connecting sheet and another end connected to an end of the seat, and the end of the second mounting base and the end of the seat being arranged opposite to each other along the first direction, wherein the suspension wire has a larger rigidity in the first direction than in a second direction, and the second direction is perpendicular to the first direction.

* * * * *